United States Patent
Hamada et al.

(10) Patent No.: US 12,476,817 B2
(45) Date of Patent: Nov. 18, 2025

(54) SECURE CONSOLIDATION SYSTEM, INFORMATION PROCESSING APPARATUS, SECURE CONSOLIDATION METHOD, AND PROGRAM

(71) Applicant: NTT, Inc., Tokyo (JP)

(72) Inventors: Koki Hamada, Tokyo (JP); Koji Chida, Tokyo (JP); Masanobu Kii, Tokyo (JP); Atsunori Ichikawa, Tokyo (JP); Junichi Tomida, Tokyo (JP)

(73) Assignee: NTT, Inc., Tokyo (JP)

( * ) Notice: Subject to any disclaimer, the term of this patent is extended or adjusted under 35 U.S.C. 154(b) by 120 days.

(21) Appl. No.: 18/556,518

(22) PCT Filed: May 21, 2021

(86) PCT No.: PCT/JP2021/019342
§ 371 (c)(1),
(2) Date: Oct. 20, 2023

(87) PCT Pub. No.: WO2022/244227
PCT Pub. Date: Nov. 24, 2022

(65) Prior Publication Data
US 2024/0214212 A1    Jun. 27, 2024

(51) Int. Cl.
*H04L 9/32* (2006.01)

(52) U.S. Cl.
CPC .................. *H04L 9/3236* (2013.01)

(58) Field of Classification Search
CPC .................. H04L 9/3236; G09C 1/00
See application file for complete search history.

(56) References Cited

U.S. PATENT DOCUMENTS

| | | | | |
|---|---|---|---|---|
| 9,276,922 | B2 * | 3/2016 | Mosko | H04L 63/123 |
| 11,477,017 | B2 * | 10/2022 | Newton | H04L 9/0869 |
| 2011/0222683 | A1 * | 9/2011 | Struik | H04L 9/0643 380/28 |
| 2017/0272239 | A1 * | 9/2017 | Minematsu | H04L 9/0618 |

OTHER PUBLICATIONS

Koji Chida et al., Anonymous Equijoin Protocol and its Applications, In SCIS Jan. 25-28, 2011.

* cited by examiner

*Primary Examiner* — Sm A Rahman
(74) *Attorney, Agent, or Firm* — IPUSA, PLLC

(57) ABSTRACT

A secure collation system performs secure-data-collation between first and second information processing apparatuses and includes the first and second information processing apparatuses. The second information-processing-apparatus creates, when receiving a first vector having a hash value of a key value of the first information-processing-apparatus as an element, a second vector by adding a dummy hash value to the first vector and rearranging the first vector by random permutation; creates a third vector having, as elements, a hash value of a key value of the second information-processing-apparatus and a hash value of a dummy key value; and transmits the second and third vectors to the first information-processing-apparatus. The first information-processing-apparatus calculates a hash value of an element of the third vector and creates a fourth vector having the hash value as an element; and collates matched values between each element of the third vector and each element of the fourth vector.

7 Claims, 3 Drawing Sheets

SECURE CONSOLIDATION SYSTEM, INFORMATION PROCESSING APPARATUS, SECURE CONSOLIDATION METHOD, AND PROGRAM

TECHNICAL FIELD

The present invention relates to a secure collation system, an information processing apparatus, a secure collation method, and a program.

BACKGROUND ART

There is a method called secure join as a method of joining data between two parties without disclosing mutual data and without disclosing which data is joined (see, for example, Non Patent Literature 1). In the method described in Non Patent Literature 1, when data is joined, one party collates lists of hash values of keys of both parties to join data held by both parties.

CITATION LIST

Non Patent Literature

Non Patent Literature 1: Koji Chida, Dai Ikarashi, Hiroki Hamada, Katsumi Takahashi, Anonymous Equijoin Protocol and its Applications, In SCIS, 2011.

SUMMARY OF INVENTION

Technical Problem

However, in the method in related art, when the lists of the hash values of the keys are collated, although which key is matched by the collation can be hidden, a party who performs the collation can ascertain the number of keys commonly included in the lists of both parties.

An embodiment of the present invention has been made in view of the above points, and an object thereof is to hide the number of values commonly included in sets of both parties, when collation is performed without disclosing sets of mutual values between two parties.

Solution to Problem

In order to achieve the object, in a secure collation system according to an embodiment that performs secure data collation between a first information processing apparatus and a second information processing apparatus, the second information processing apparatus includes: a first creation unit that, when receiving a first vector having a hash value of a key value of the first information processing apparatus as an element, creates a second vector by adding a dummy hash value to the first vector and rearranging the first vector by random permutation; a second creation unit that creates a third vector having, as elements, a hash value of a key value of the second information processing apparatus and a hash value of a dummy key value; and a first transmission unit that transmits the second vector and the third vector to the first information processing apparatus, and the first information processing apparatus includes: a third creation unit that, when receiving the second vector and the third vector, calculates a hash value of an element of the third vector and creates a fourth vector having the hash value as an element; and a collation unit that collates matched values between each element of the third vector and each element of the fourth vector.

Advantageous Effects of Invention

When collation is performed without disclosing sets of mutual values between two parties, the number of values commonly included in both parties can be hidden.

DESCRIPTION OF EMBODIMENTS

Hereinafter, an embodiment of the present invention will be described. In the present embodiment, a secure collation system 1 which can hide the number of values commonly included in sets of both parties, when collation is performed without disclosing sets of mutual values between two parties will be described. The value to be collated between the two parties is also referred to as a key (more strictly, a key value) or an ID, but is hereinafter referred to as an ID. Note that the collation is to determine whether or not two values match, and is used for, for example, data join.

<Overall Configuration>

Figure 1:
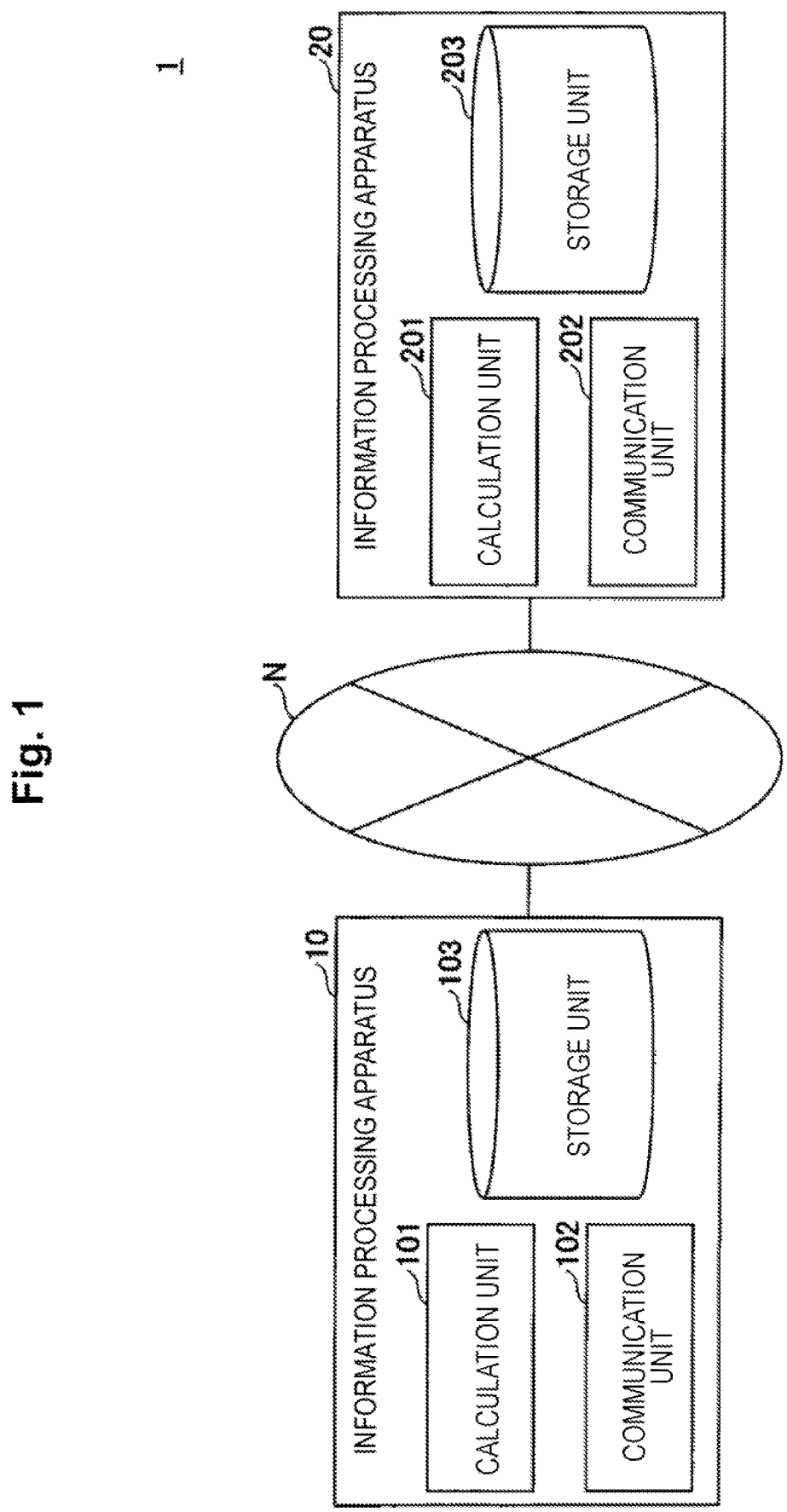
FIG. 1 is a diagram illustrating an example of an overall configuration of a secure collation system according to the present embodiment.

First, an overall configuration of the secure collation system 1 according to the present embodiment will be described with reference to FIG. 1. FIG. 1 is a diagram illustrating an example of an overall configuration of the secure collation system 1 according to the present embodiment.

As illustrated in FIG. 1, the secure collation system 1 according to the present embodiment includes an information processing apparatus 10 and an information processing apparatus 20 that perform collation without disclosing mutual IDs between two parties (this is also called secure collation). The information processing apparatus 10 and the information processing apparatus 20 are communicably connected via a communication network N such as the Internet.

The information processing apparatus 10 and the information processing apparatus 20 are, for example, various devices or equipment, such as a general-purpose server, a personal computer (PC), a smartphone, a tablet terminal, and a wearable device.

Here, the information processing apparatus 10 includes a calculation unit 101, a communication unit 102, and a storage unit 103. Note that the calculation unit 101 and the communication unit 102 are implemented by processing caused to be executed by a processor such as a central processing unit (CPU) by one or more programs installed in the information processing apparatus 10. Furthermore, the storage unit 103 is implemented by, for example, various memory devices such as a hard disk drive (HDD), a solid state drive (SSD), and a flash memory.

The calculation unit 101 executes various calculations for realizing secure collation with the information processing apparatus 20. The communication unit 102 transmits and receives various data to and from the information processing apparatus 20. The storage unit 103 stores one or more IDs to be subjected to secure collation.

Furthermore, the information processing apparatus 20 includes a calculation unit 201, a communication unit 202, and a storage unit 203. Note that the calculation unit 201 and the communication unit 202 are implemented by processing caused to be executed by a processor such as a CPU by one or more programs installed in the information processing apparatus 20. Furthermore, the storage unit 203 is implemented by, for example, various memory devices such as an HDD, an SSD, and a flash memory.

The calculation unit 201 executes various calculations for realizing secure collation with the information processing apparatus 10. The communication unit 202 transmits and receives various data to and from the information processing apparatus 10. The storage unit 203 stores one or more IDs to be subjected to secure collation.

Note that, hereinafter, the information processing apparatus 10 itself or a person who uses or manages the information processing apparatus 10 is referred to as a "user A". Similarly, the information processing apparatus 20 itself or a person who uses or manages the information processing apparatus 20 is referred to as a "user B".

<Preparation>

Before secure collation processing is described, some symbols, concepts, and the like are prepared.

It is assumed that $h_k$ is a hash function defined by a secret key k, and for any two secret keys $k_1$ and $k_2$, $$h_{k_1}, h_{k_2} \quad \text{[Math. 1]}$$

is commutative. Here, arbitrary hash functions f and g being commutative indicate that $f(g(x))=g(f(x))$ holds for an arbitrary value x.

Hereinafter, as a secret key $k_A$ of the user A, a hash function determined by the secret key $k_A$ is expressed as "$h_{kA}$" in the text of the specification. Similarly, as a secret key $k_B$ of the user B, a hash function determined by the secret key $k_B$ is expressed as "$h_{kB}$" in the text of the specification.

Note that, in a case where x is a vector and an i-th element thereof is x[i], $h_k(x)$ is a vector at which $h_k(x[i])$ is an i-th element. The vector x is accurately represented by a symbol obtained by adding "→" directly above "x", but "→" may omitted in the text of the present specification.

In addition, a vector having an ID of the user A as an element is defined as a. Similarly, a vector having an ID of the user B as an element is defined as b. Furthermore, a vector having a hash value, by $h_{kA}$, of a dummy ID as an element is defined as $d_A$. That is, when a vector having a dummy ID as an element is d, $h_{kA}(d)=d_A$. Here, the dummy ID is an ID that becomes a dummy.

<Secure Collation Processing>

Figure 2:
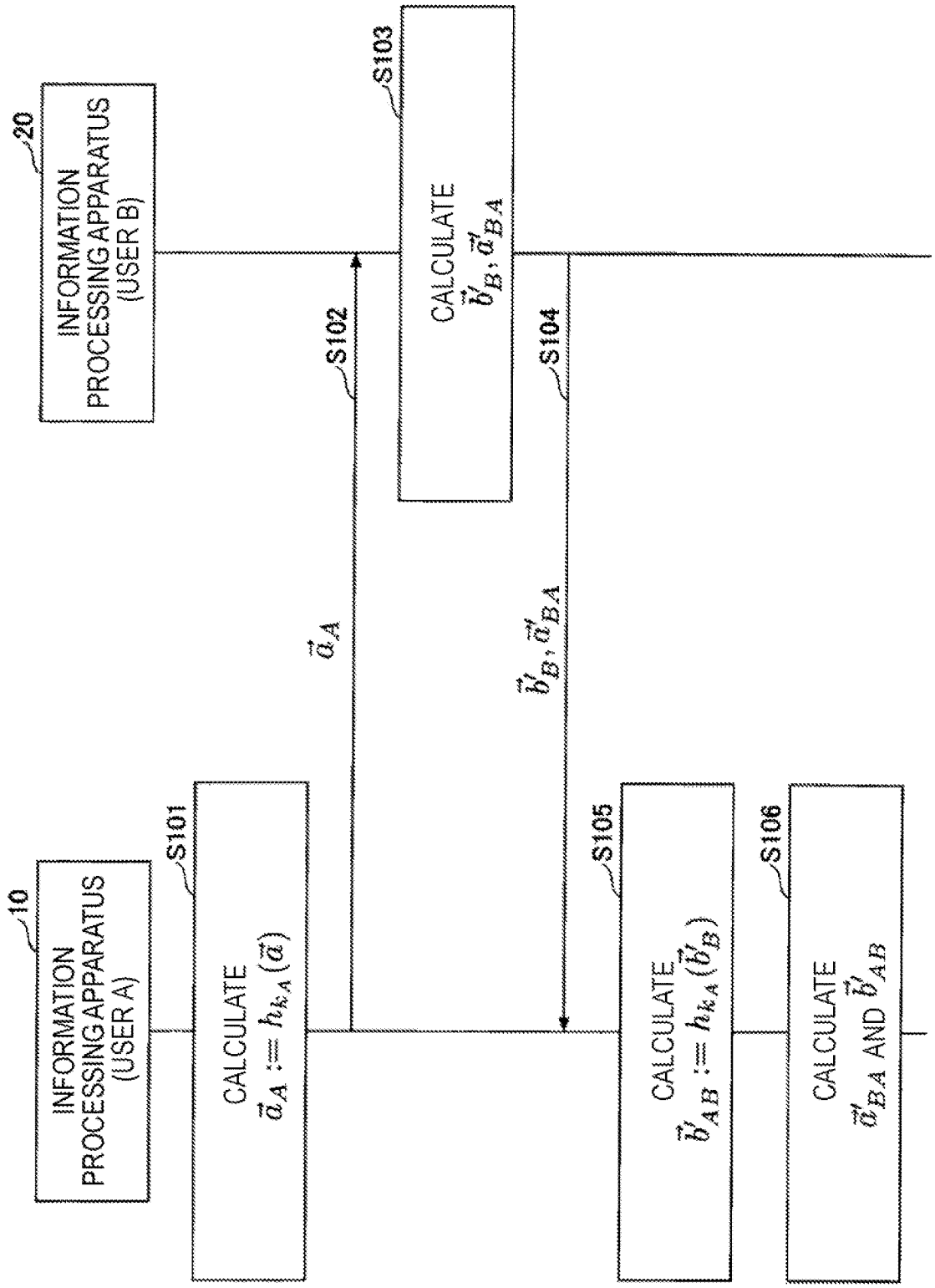
FIG. 2 is a sequence diagram illustrating an example of secure collation processing according to the present embodiment.

Hereinafter, the secure collation processing according to the present embodiment will be described with reference to FIG. 2. FIG. 2 is a sequence diagram illustrating an example of the secure collation processing according to the present embodiment. Note that it is assumed that the vector $d_A$ is given to the user B in advance.

First, the calculation unit 101 of the information processing apparatus 10 calculates $a_A:=h_{kA}(a)$ (step S101). Next, the communication unit 102 of the information processing apparatus 10 transmits the vector $a_A$ to the information processing apparatus 20 (step S102).

When the communication unit 202 receives the vector $a_A$, the calculation unit 201 of the information processing apparatus 20 executes the following (1) and (2) (step S103).

(1) A vector d' having a dummy ID as an element is randomly created. Note that the dummy ID can be different from a dummy ID of the element of the vector d described above.

(2) $b'_B:=h_{kB}(\pi(b\|d'))$ and $a'_{BA}:=h_{kB}(\sigma(a_A\|d_A))$ are calculated. Here, π and σ represent random permutations, and ∥ represents a combination of vectors.

That is, the first expression of (2) indicates that the dummy ID is joined with the vector b having the ID of the user B as an element, and then the random permutation is performed and the hash value is calculated. Similarly, the second expression indicates that a hash value of the dummy ID is joined with the vector $a_A$ having the hash value of the ID of the user A as an element, and then the random permutation is performed and the hash value is calculated.

Next, the communication unit 202 of the information processing apparatus 20 transmits the vectors $b'_B$ and $a'_{BA}$ to the information processing apparatus 10 (step S104).

When the communication unit 102 receives the vectors $b'_B$ and $a'_{BA}$, the calculation unit 101 of the information processing apparatus 10 calculates $b'_{AB}:=h_{kA}(b'_B)$ (step S105).

Then, the calculation unit 101 of the information processing apparatus 10 collates the vector $a'_{BA}$ and the vector $b'_{AB}$ (step S106). That is, the calculation unit 101 determines whether or not values in each element of the vector a's and each element of the vector $b'_{AB}$ match, and specifies a set of elements in which the values match.

As described above, for example, when the number of matched IDs between the vector a and the vector b is x and the number of matched dummy IDs between the vector d and the vector d' is r, the user A can ascertain that x+r IDs match, but since r is a number that only the user B can ascertain, the user A cannot ascertain x. Therefore, it is possible to hide the number x of IDs common between the set of IDs of the user A and the set of IDs of the user B.

As described above, in the present embodiment, a dummy is added to IDs of both parties, and only one party can ascertain the number r of IDs matched between the dummies, so that the other party cannot ascertain the number of common IDs.

Here, the above-described r can also be controlled by the user B. Specifically, for example, when a length (the number of elements) of $d_A$ is n, and the vector d' is created in (1) in step S103, a random integer r satisfying 0≤r≤n is created, and then a vector d' may be created such that the number of elements common between the vector d and the vector d' is r.

<Hardware Configuration>

Figure 3:
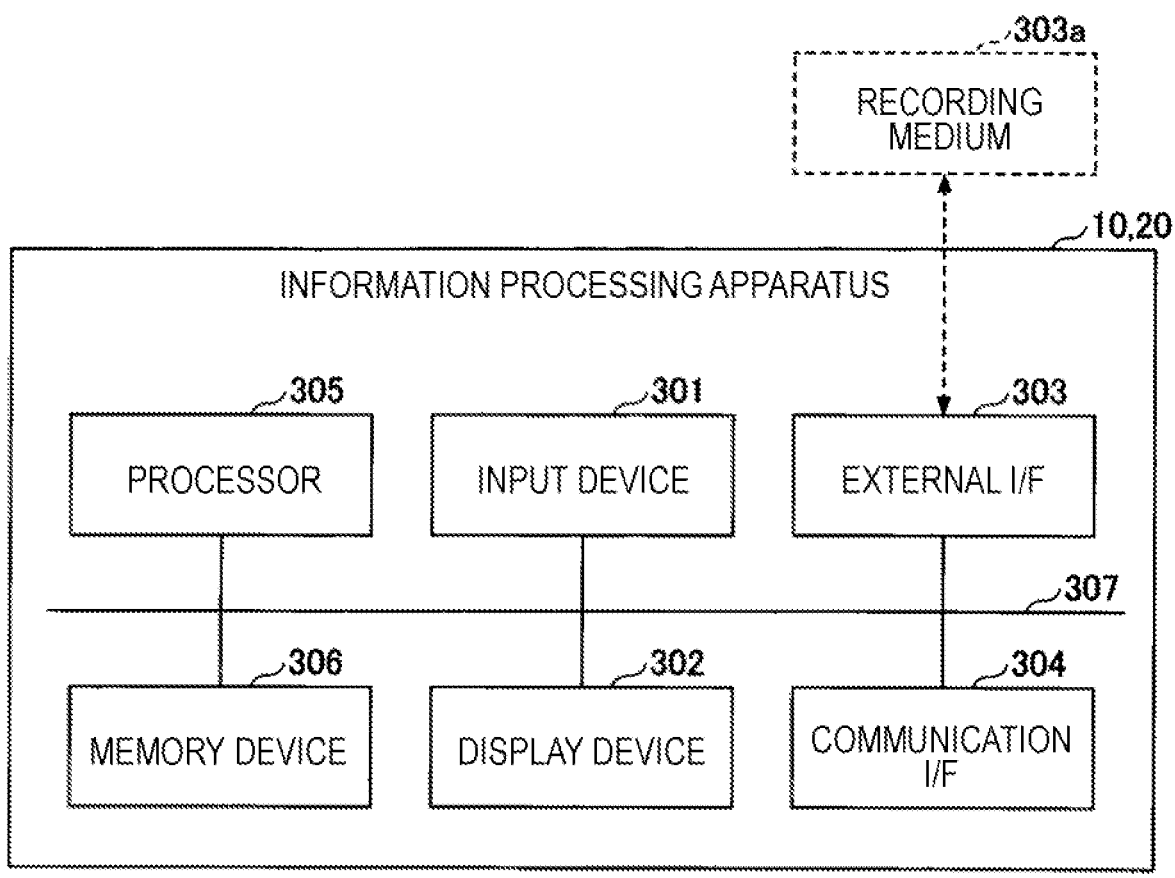
FIG. 3 is a diagram illustrating an example of a hardware configuration of an information processing apparatus according to the present embodiment.

Finally, hardware configurations of the information processing apparatuses 10 and 20 according to the present embodiment will be described with reference to FIG. 3. FIG. 3 is a diagram illustrating an example of the hardware configurations of the information processing apparatuses 10 and 20 according to the present embodiment. Note that the information processing apparatuses 10 and 20 can be implemented by substantially the same hardware configurations, and thus the hardware configuration of the information processing apparatus 10 will be described below.

As illustrated in FIG. 3, the information processing apparatus 10 according to the present embodiment includes an input device 301, a display device 302, an external I/F 303, a communication I/F 304, a processor 305, and a memory device 306. These pieces of hardware are communicably connected by a bus 307.

The input device 301 is, for example, a keyboard and a mouse, a touch panel, or the like. The display device 302 is, for example, a display or the like. Note that the information processing apparatus 10 does not have to include, for example, at least one of the input device 301 or the display device 302.

The external I/F 303 is an interface with an external device such as a recording medium 303a. The information processing apparatus 10 can perform reading, writing, and the like of the recording medium 303a via the external I/F 303. Note that examples of the recording medium 303a include a compact disc (CD), a digital versatile disk (DVD), a secure digital memory card (SD memory card), a universal serial bus (USB) memory card, and the like.

The communication I/F 304 is an interface for connecting the information processing apparatus 10 to the communication network N. The processor 305 is one of various arithmetic devices such as a CPU, for example. The memory device 306 is, for example, various storage devices such as an HDD, an SSD, a flash memory, a random access memory (RAM), and a read only memory (ROM).

The information processing apparatuses 10 and 20 according to the present embodiment can implement the above-described secure join processing by having the hardware configuration illustrated in FIG. 3. Note that the hardware configuration illustrated in FIG. 3 is an example, and the information processing apparatuses 10 and 20 may include, for example, a plurality of processors, a plurality of memory devices, or various hardware configurations.

The present invention is not limited to the above embodiment specifically disclosed, and various modifications and changes, combinations with known technologies, and the like can be made without departing from the scope of the claims.

REFERENCE SIGNS LIST

1 Secure collation system
10 Information processing apparatus
20 Information processing apparatus
101 Calculation unit
102 Communication unit
103 Storage unit
201 Calculation unit
202 Communication unit
203 Storage unit
301 Input device
302 Display device
303 External I/F
303a Recording medium
304 Communication I/F
305 Processor
306 Memory device
307 Bus
N Communication network

The invention claimed is:

1. A secure collation system comprising a first information processing apparatus and a second information processing apparatus,
wherein the second information processing apparatus is configured to:
receive a first vector having a hash value of a key value of the first information processing apparatus as an element, and create a second vector by adding a dummy hash value to the first vector and rearranging the first vector by random permutation;
create a third vector having, as elements, a hash value of a key value of the second information processing apparatus and a hash value of a dummy key value; and
transmit the second vector and the third vector to the first information processing apparatus, and
wherein the first information processing apparatus is configured to:
receive the second vector and the third vector, calculate a hash value of an element of the third vector and create a fourth vector having the hash value as an element; and
collate matched values between each element of the third vector and each element of the fourth vector.

2. The secure collation system according to claim 1, wherein, when f and g are commutative hash functions,
the first information processing apparatus is further configured to:
calculate, by f, the hash value of the key value of the first information processing apparatus and creates the first vector having the hash value as the element; and
transmit the first vector to the second information processing apparatus, and
the second information processing apparatus is further configured to calculate, by g, the hash value of the key value of the second information processing apparatus and calculate, by g, the hash value of the dummy key value, and create the third vector having, as elements, the hash value of the key value of the second information processing apparatus and the hash value of the dummy key value that are calculated by g.

3. The secure collation system according to claim 1, wherein
the second information processing apparatus is further configured to create a second dummy vector such that the number of elements having a common value is a predetermined number, between a first dummy vector including a key value for calculating the dummy hash value to be added to the first vector and the second dummy vector including the key value for calculating the dummy hash value to be used as the element of the third vector.

4. An information processing apparatus comprising:
a processor; and
a memory storing program instructions that cause the processor to:
receive a first vector having a hash value of a key value of another information processing apparatus as an element, and create a second vector by adding a dummy hash value to the first vector and rearranging the first vector by random permutation;
create a third vector having, as elements, a hash value of a key value of the information processing apparatus and a hash value of a dummy key value; and
transmit the second vector and the third vector to the another information processing apparatus.

5. An information processing apparatus comprising:
a processor; and
a memory storing program instructions that cause the processor to:
receive a second vector obtained by adding a dummy hash value to a first vector having a hash value of a key value of the information processing apparatus as an element and rearranging the first vector by random permutation, and a third vector having, as elements, a hash value of a key value of the another information processing apparatus and a hash value of a dummy key value, and calculate a hash value of an element of the third vector and creates a fourth vector having the hash value as an element; and
collate matched values between each element of the third vector and each element of the fourth vector.

6. A secure collation method comprising:
using a second information processing apparatus, executing:
receiving a first vector having a hash value of a key value of a first information processing apparatus as an element, and creating a second vector by adding a dummy hash value to the first vector and rearranging the first vector by random permutation;
creating a third vector having, as elements, a hash value of a key value of the second information processing apparatus and a hash value of a dummy key value; and
transmitting the second vector and the third vector to the first information processing apparatus, and
using the first information processing apparatus, executing:
receiving the second vector and the third vector, and calculating a hash value of an element of the third vector and creating a fourth vector having the hash value as an element; and
collating matched values between each element of the third vector and each element of the fourth vector.

7. A non-transitory computer-readable recording medium having stored therein a program for causing the first information processing apparatus and the second information processing apparatus to execute the secure collation method according to claim 6.

\* \* \* \* \*